United States Patent [19]

Kubis et al.

[11] Patent Number: 4,909,022

[45] Date of Patent: Mar. 20, 1990

[54] NEST FOR CONTAINER CLOSING MACHINE

[75] Inventors: Charles S. Kubis, Palos Heights; John Walter, Evergreen Park, both of Ill.

[73] Assignee: Continental Can Company, Inc., Norwalk, Conn.

[21] Appl. No.: 207,507

[22] Filed: Jun. 16, 1988

[51] Int. Cl.$^4$ .................. B65B 31/02; B65B 51/22
[52] U.S. Cl. ........................ 53/510; 53/300; 53/373; 53/DIG. 2; 198/803.01
[58] Field of Search ............... 53/510, 511, 97, 109, 53/300, 559, 560, 373, DIG. 2; 198/803.01

[56] References Cited

U.S. PATENT DOCUMENTS

| | | | |
|---|---|---|---|
| 1,168,905 | 1/1916 | Paridon | 198/803.01 X |
| 3,247,643 | 4/1966 | Bartelt | 53/511 X |
| 3,362,130 | 1/1968 | Celorio | 53/559 X |
| 3,398,500 | 8/1968 | Inman | 53/510 X |
| 3,452,513 | 7/1969 | Owens, Jr. | 53/510 X |
| 3,478,488 | 11/1969 | Jensen et al. | 53/510 |
| 3,509,686 | 5/1970 | Bergstrom | 53/511 |
| 3,908,334 | 9/1975 | Rychiger | 53/510 X |
| 4,402,393 | 9/1983 | Kent | 198/803.01 X |
| 4,778,045 | 10/1988 | Grune et al. | 198/803.01 |

Primary Examiner—Horace M. Culver
Attorney, Agent, or Firm—Charles E. Brown; Paul Shapiro; Charles A. Brown

[57] ABSTRACT

This relates to a nest for receiving a container which is to be filled and thereafter have a lid applied thereto with the lid being sealed to the container by a sealing head in conjunction with the nest. Most particularly, there will be a plurality of such nests with the nests being carried by an endless conveyor chain. The endless conveyor chain is provided with special links which are elongated and wherein an upper one of each set of elongated links is adapted to have seated thereon a nest in supporting relation. Further, the chain links are connected together by customary pins which have been elongated so as to project upwardly above the chain. In conjunction with these projecting pins, the nest is provided with bores which receive the pins. Thus the nest may be readily placed on and removed from the conveyor chain. Each nest is in the form of a housing which defines a cavity for a container. An upper part of the cavity carries a seat member over which a flange of a container is engaged. The seat member also divides the cavity into a container receiving cavity and a vacuum chamber. Further, the upper surface of the nest surrounding the vacuum chamber is smooth so as to provide sealing engagement between the sealing head and the nest so that a vacuum may be first drawn within the nest and thereafter an inert gas provided thereto so that a vacuum may be drawn within a container prior to the closing thereof and the container filled with the gas. The seat member also provides an adequate support for the container and lid when the same are engaged by an induction heating coil so that the required bonding pressure may be applied thereto the lid.

16 Claims, 2 Drawing Sheets

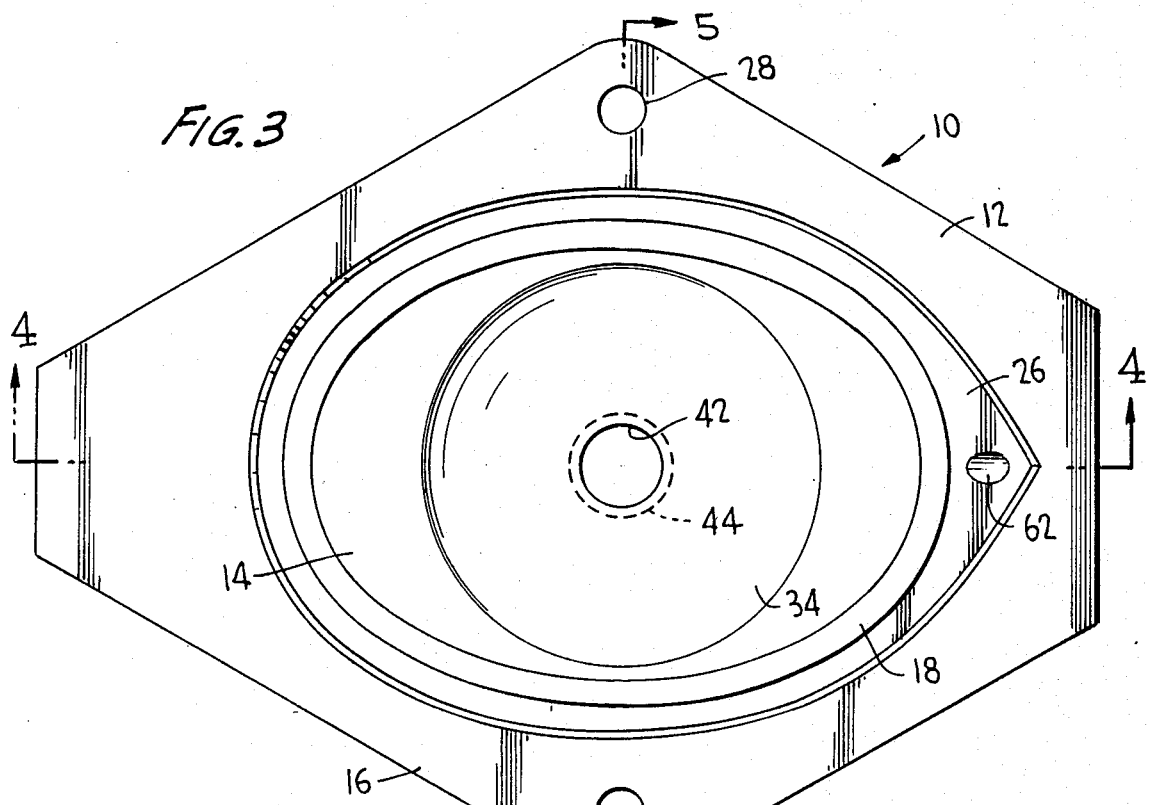
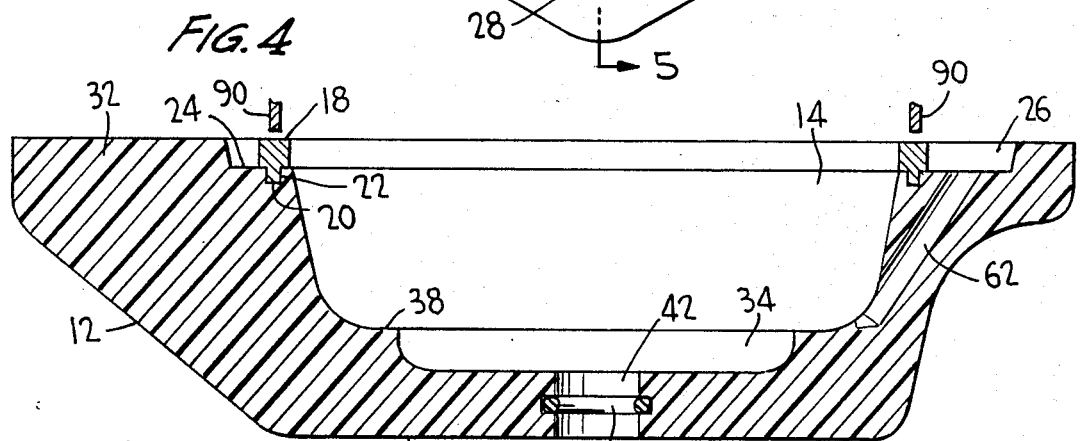
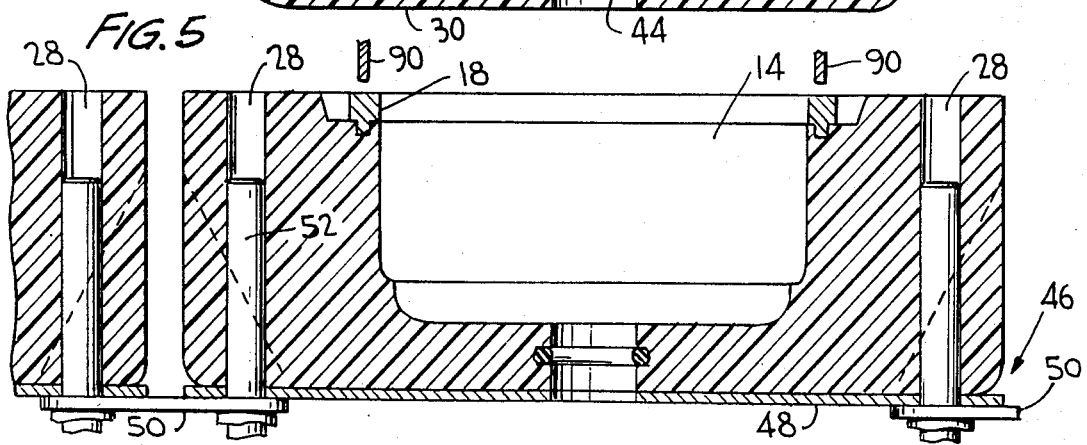

NEST FOR CONTAINER CLOSING MACHINE

This invention relates in general to new and useful improvements in container closing machines, and more particularly to a nest for a container to be closed.

In accordance with this invention, there is provided a nest which is preferably in the form of a molded housing defining a cavity for a container to be filled and closed. The nest is to be utilized in a combined filling and closing machine which includes an endless chain conveyor and wherein the chain is formed of elongated links and short links joined together by pins. The pins extend upwardly above the chain and each nest is provided with a pair of openings for receiving a pair of pins to position the nest in seated overlying relation with respect to an associated elongated link.

In accordance with the invention, the upper part of the housing is provided with a container flange engaging seat member which defines the outer periphery of the container receiving cavity. However, the cavity extends radially outwardly beyond the seat member and the peripheral outer portion of the cavity defines a vacuum chamber whereby a vacuum may be drawn in a container immediately prior to the closing thereof by way of a lid.

Further in accordance with this invention, there is a conduit between the vacuum chamber and a lower portion of the cavity whereby when the vacuum is drawn internally of the container, a similar vacuum is drawn externally of the container so as to equalize the pressure internally and externally of the container and thereby prevent deformation due to the drawing of the vacuum.

In accordance with this invention, a filled and sealed container will be removed from the nest by way of a lift pad which is provided with a lift pin and extends through the bottom of the nest and is engaged by a lifting mechanism which forms no part of the invention.

In order to maintain the vacuum within the lower portion of the cavity, the nest has a bore which receives the lift pin and the bore is provided with a seal with the lift pin so as to prevent the passage of a gas around the lift pin.

Further, in order to maintain the vacuum within the vacuum chamber, the upper surface of the housing surrounding the vacuum chamber is smooth for contact by a sealing ring carried by an associated sealing head.

The sealing head will not only be provided with a vacuum conduit aligned with the vacuum chamber, but also with an induction heating coil aligned with the seat member for inducing electrical heating energy into a lid for the container to thereby provide for a heat seal bond between such lid and associated container.

Further, at such time as there is associated with the nest the sealing head, the conveyor chain will be passing around the sprocket and a projecting portion of the sprocket will support the elongated link on which the nest is seated thereby permitting the pressure engagement of the nest by the sealing head without undue deflection of the nest.

Finally, it is to be understood that not only is the nest utilized in the closing of an associated container, but when the closing machine is part of an overall combined filling and closing machine, will support a container during a filling operation. The sealing head preferably has suction cup means for applying a lid to the container to be closed.

Other advantages and characteristics of the invention will appear from a reading of the following description, given purely by way of illustration and example, with reference to the accompanying drawings, in which:

FIG. 3 is a plan view of the nest of FIG. 1 separate and apart from the conveyor chain and the sealing head.

FIG. 4 is a longitudinal vertical sectional view taken generally along the line 4—4 of FIG. 3.

FIG. 5 is a vertical sectional view taken generally along the line 5—5 of FIG. 3 and additionally shows the relationship of the nest with respect to a supporting conveyor chain and an adjacent nest.

FIG. 6 is an exploded perspective view of the nest and an associated chain and sprocket.

FIG. 7 is an elevational view showing the nest carried by the chain which is on the sprocket.

Figure 1:
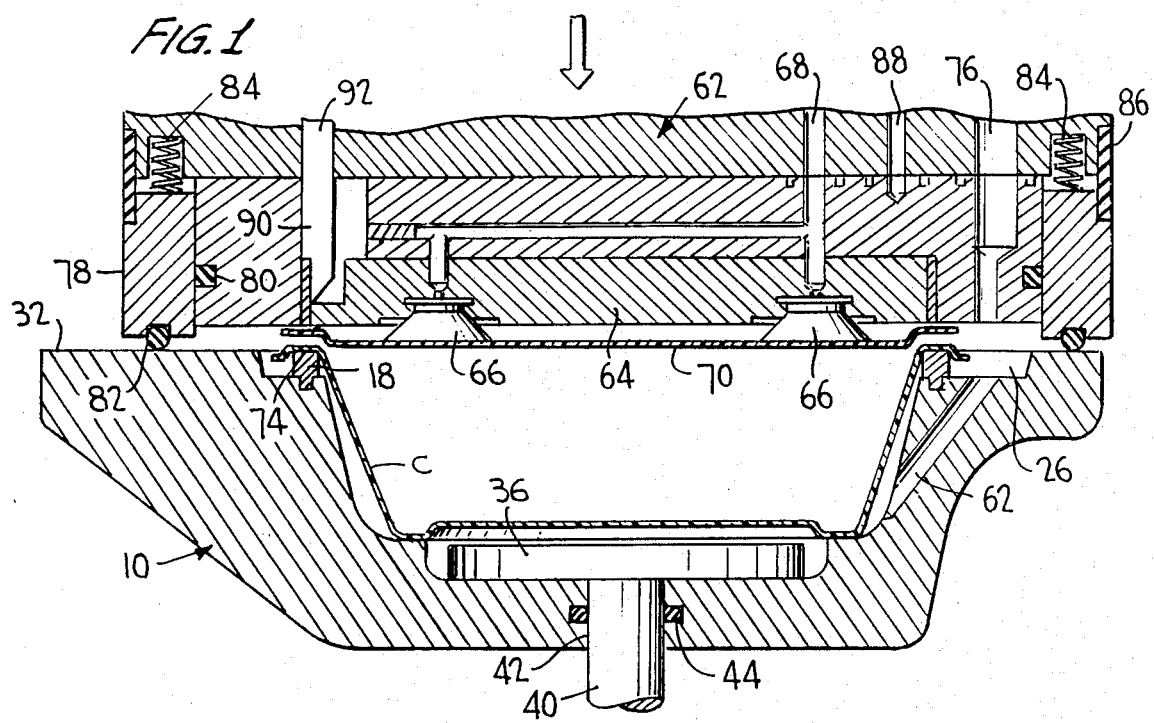
FIG. 1 is a transverse vertical sectional view taken through a single cavity nest formed in accordance with the invention and shows the nest supported by a conveyor chain and having associated therewith a sealing head.

Referring now to the drawings in detail where reference is first made to FIGS. 3, 4 and 5 wherein the details of a single cavity nest for an oval container are specifically illustrated. The nest is generally identified by the numeral 10 and is the form of a molded plastic housing 12. The housing 12 is generally diamond shaped in plan and defines a cavity 14 which opens through an upper surface 16 thereof.

The container receiving portion of the cavity 14 is particularly defined by a container flange engaging seat member 18 which has a reduced cross section lower portion 20 seated in a peripheral groove 22 formed in a shoulder portion 24 of the cavity 14. The seat member 18 is also formed of a plastic material and preferably has the characteristic of being resiliently deformable under load.

At this time it is pointed out that the seat member 18 sets off a peripherally outer portion of the cavity 14 above the ledge 24 to define a vacuum chamber 26 for a purpose to be described hereinafter.

As will be described hereinafter, it is intended that the nest 10 be seated on an elongated link of an endless conveyor chain and that it be positioned by two upstanding pins, one at each end of such link. To this end, transverse corner portions of the housing 12 are provided with through bores 28 for receiving such pins. In conjunction with the seating of the nest 10 on a conveyor chain link, it is to be noted with reference to FIGS. 4 and 5, the housing 12 has a flat bottom surface 30. Further, it is to be understood that the housing 12 will have a smooth upper surface 3 surrounding the vacuum chamber 26 for the purpose of forming a seal with a sealing head in a manner described hereinafter.

Further, in order that a filled and sealed container may be readily removed from the nest 10 in a manner which does form a part of this invention, the cavity 14 is provided with a lower centered extension 34 in which, as is best shown in FIG. 1, there is seated a lift pad 36. It is to be noted that the diameter of the cavity extension 34 is one wherein it is surrounded by a bottom seat portion 38 of the cavity 14.

Further, with reference to FIG. 1, it will be seen that suitably secured to the underside of the lift pad 36 and depending downwardly therefrom is an elongated lift pin 40. The lift pin 40 extends through a bore 42 through the bottom of the housing 12. In order that the bottom of the cavity 14 may be sealed, the bore 42 incorporates a sealing ring 44 for sealing engagement with the lift pin 40.

It is to be understood that a typical filling and closing machine incorporating the nest 10 will include a large number of such nests, depending upon the length of the associated conveyor chain. Further, it is to be understood that the nest 10, as described, is to be removed from the associated conveyor chain merely by lifting the nest off the chain so that the nest may be readily replaced for cleaning and repairs.

With reference to FIGS. 5, 6 and 7 wherein an associated conveyor chain 46 is illustrated, it will be seen that the conveyor chain 46 includes elongated links 48,49 and short links 50 which are connected together by pins 52 in a normal manner. The links 48,49 and 50 are provided in top and bottom sets. The two sets of links are separated by rollers 54 which are carried by the pins 52 between the two sets of links. It is to be understood that the rollers 54 will engage conventional teeth 56 of a sprocket 58 which is mounted in a conventional manner for rotation about a fixed axis. The sprocket teeth 56 are widely circumferentially spaced in accordance with the lengths of the links 48,49. However, the sprocket 58 has projecting portions 60 intermediate the teeth 56 for projecting between the links 48,49 and providing a stable support for the elongated links 48 of the upper set of links. This, in turn, provides for a stable supporting of the nest 12 due to the engagement of the flat bottom surface 30 of the housing 12 with the upper surface of the elongated link 48 as is clearly shown in FIGS. 5 and 7. The chain parts are held together by retaining rings 53 on the pins 52, see FIG. 7.

At this time, it is pointed out that the purpose of the vacuum chamber 26 is to draw a vacuum within a container prior to a sealing lid being applied thereto. In order that there may be equalization of pressure externally and internally of the container C, the housing 12 is provided with the conduit 62 in the form of a downwardly and inwardly sloping bore which connects the vacuum chamber 26 with the lower portion of the conduit 14 in the manner shown in FIG. 4.

During the utilization of the nest 10 and the closing and sealing of the container C, there is associated with each nest 10 on a sequential basis a sealing head which is generally identified by the numeral 64 and which is shown in FIGS. 1 and 7. Only those details of the sealing head which relate to its association with the nest 10 are specifically described herein. Other details of the sealing head are found in a copending application.

First of all, the sealing head 62 includes a lower center member 64 which carries a pair of suction heads 66. The suction heads are coupled to a vacuum line 68 and are operable to carry a lid 70 and present the same to the container C to be sealed. It is to be noted that the lid 70 is provided with a peripheral sealing flange 72. It is also to be noted at this time that the container to be sealed is provided with a peripheral sealing flange 74 which is seated on the seat member 18 in the manner shown in FIG. 1.

Next, it will be seen that the sealing head 62 incorporates a vacuum line 76 which opens through the underside of the sealing head 62 in alignment with the vacuum chamber 26. In order that the vacuum chamber 26 may be sealed, the sealing head 62 is provided with a peripheral carrier 78 which is telescoped over a lower portion of the sealing head 62 for vertical movement and is sealed relative thereto by a suitable sealing ring 80. The carrier 78 is provided on the underside thereof with the sealing ring 82 which is aligned with and engages the smooth upper surface 32 of the housing 12 to form a seal therewith.

At this time, it is pointed out that the carrier 78 is spring loaded by way of circumferentially spaced springs 84 and thus can move upwardly against the compression of the springs 84 once the sealing ring 82 contacts the upper surface 32.

It is also to be noted that the carrier 78 is joined to an upper portion of the sealing head 62 by way of a flexible and resilient band 86. The band 86 serves the purpose of restricting downward movement of the carrier 78 due to the actions of the springs 84 while being formable to permit the upward movement of the carrier 78 when the sealing head 62 contacts the associated nest 10.

It is to be understood that a vacuum will be drawn in the vacuum chamber 26 through the vacuum line 76 only after a seal has been made between the carrier 78 and the nest 10.

It is also to be noted that the sealing head 62 is provided with a conduit 88 for an inert gas. In accordance with the intended operation of the closing machine of which the nest 10 is a part, after a vacuum has been drawn within the container C, the container will be filled with an inert gas. Thus the conduit 88 has an opening through the underside of the sealing head 62 which will be aligned with the vacuum chamber 26. This opening is not illustrated.

Finally, it is to be understood that once the vacuum has been drawn within the container C and then the container C has been filled with an inert gas, the flange 72 of the lid 70 will be seated on the flange 74 of the container C and the two flanges clamped together between the seat member 18 and a peripheral induction heating coil 90. The induction heating coil 90 projects slightly below the underside of the sealing head 62 and is energized by being connected to a source of high frequency electrical energy (not shown) by means of conductors 92.

It is to be understood that as such time as the lid flange 72 is clamped against the container flange 74 by the induction heating coil 90, vacuum within the suction heads 66 will be released so that once the heat sealing of the flanges 72, 74 together has been accomplished, the sealing head 62 will be free to be lifted relative to the nest 10 with the lid 70 released and terminally bonded to the container C.

Figure 2:
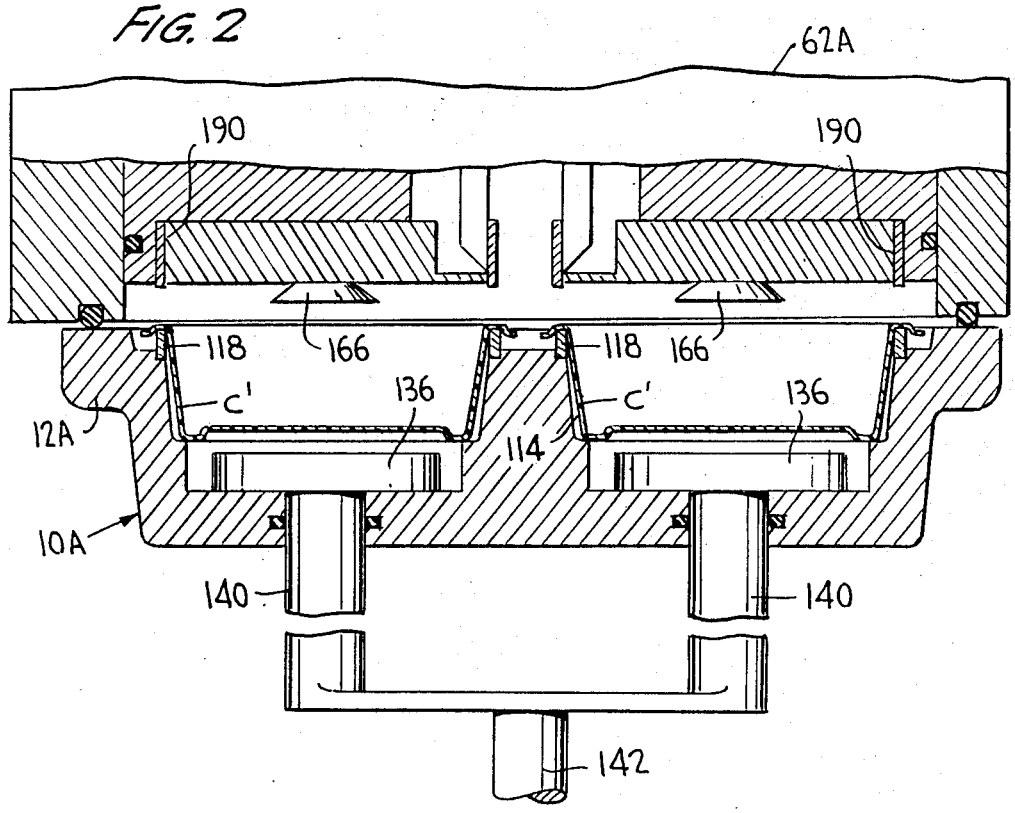
FIG. 2 is a transverse sectional view similar to FIG. 1 and shows a two cavity nest.

Although in the preferred embodiment of the invention, the nest 10 is specifically constructed to receive a single elongated, generally oval container, it is to be understood that a similar nest 10 A may be constructed so that the housing 12A thereof defines two cavities 114 for receiving smaller containers C. Each of the cavities 114 will be provided with its own seat member 118 as well as its own lift pad 136. Individual lift pins 140 will be connected to the lift pad 136 with the two lift pins 140 being joined by a single actuator pin 142 as schematically shown at the bottom of FIG. 2.

Also, there will be a modified sealing head 62 A which, among other modifications, will include separate induction heating coils 190 for each cavity 114 as well as a single suction head 166 for each lid.

Although only two preferred embodiments of the nest have been specifically illustrated and described herein, it is to be understood that minor variations may be made in the nest construction and the related conveyor chain and sealing head without departing from the spirit and scope of the invention as defined by the appended claims.

We claim:

1. A nest for use in a container filling and closing apparatus, said nest comprising a housing having a flat bottom surface forming means for seating on a chain link, and a pair of spaced vertical bores opening through said flat bottom surface for receiving mounting pins projecting upwardly at the ends of such links whereby said nest may be freely mounted on an endless conveyor chain link for ease of removal and replacement.

2. A nest according to claim 1 wherein said housing has an upper surface, and a container receiving cavity opening through said upper surface.

3. A nest according to claim 2 wherein said cavity is provided with a separate container flange engaging seat member.

4. A nest according to claim 3 wherein said cavity is a stepped cavity including a main cavity and a shallow upper part that extends radially outwardly beyond said seat member to define a vacuum chamber surrounding said seat member for drawing a vacuum within a container seated in said nest on said seat member.

5. A nest according to claim 4 wherein said housing has a conduit extending from said vacuum chamber into a lower part of said cavity to also form a vacuum in said cavity externally of a container seated in said cavity.

6. A nest according to claim 4 wherein said housing upper surface surrounding said vacuum chamber is smooth and defines a sealing surface for forming a seal with a sealing head.

7. A nest according to claim 4 wherein said seat member is seated on said shallow upper part surrounding said main cavity.

8. A nest according to claim 2 wherein said cavity is provided with a separate container flange engaging seat member formed of a resiliently deformable material.

9. A nest according to claim 8 wherein said cavity is a stepped cavity including a main cavity and a shallow upper part that extends radially outwardly beyond said seat member to define a vacuum chamber surrounding said seat member for drawing a vacuum within a container seated in said nest on said seat member, said container flange engaging seat member being replaceably seated on said shallow upper part surrounding said main cavity.

10. A nest according to claim 1 wherein said bores are formed in portions of said housing spaced laterally from said cavity.

11. A nest according to claim 1 wherein said bores are specifically spaced to seat said nest on a single conveyor chain.

12. A nest according to claim 1 wherein said bores are specifically spaced to seat said nest on a single conveyor chain and to receive mounting pins forming extensions of conveyor chain link connecting pins which extend vertically from a generally horizontally disposed chain.

13. In a closing machine, an endless conveyor chain including elongated links and short links, pins passing through and joining together said elongated links and said short links, said pins projecting upwardly above said links and forming nest positioning means, a nest seated on at least certain of said elongated links and each nest having a pair of vertical bores receiving pins at ends of an associated elongated link, said nest being in the form of a housing defining a cavity for a container, said closing machine including a sprocket mounted for rotation and having a projecting portion for sequential projection below said elongated links for supporting an overlying nest, and at least one sealing head positioned above said sprocket for rotation in unison with said sprocket, said sealing head being generally vertically aligned with said sprocket projecting portion and being vertically moveable to clamp a lid on a container seated in said nest.

14. A closing machine according to claim 13 wherein said cavity is provided with a container flange engaging seat member, said cavity extends radially outwardly beyond said seat member to define a vacuum chamber for drawing a vacuum within a container seated on said seat member, said housing having a smooth upper surface surrounding said vacuum chamber, said sealing head having a vacuum conduit opening into said vacuum chamber, and sealing means engaging said housing smooth upper surface.

15. A closing machine according to claim 14 wherein said sealing head has an induction heating coil aligned with said seat member for heating a lid seated on a container positioned in said cavity to heat bond such lid to such container.

16. A closing machine according to claim 14 wherein said sealing head has lid carrying means aligned with said cavity.

* * * * *